(12) United States Patent
Strasser

(10) Patent No.: US 7,359,826 B2
(45) Date of Patent: Apr. 15, 2008

(54) METHOD AND DEVICE FOR DETECTION OF OSCILLATIONS BY A POSITION MEASURING SYSTEM

(75) Inventor: Erich Strasser, Trostberg (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 385 days.

(21) Appl. No.: 09/835,293

(22) Filed: Apr. 13, 2001

(65) Prior Publication Data

US 2005/0073298 A1    Apr. 7, 2005

(30) Foreign Application Priority Data

Apr. 13, 2000 (DE) .............................. 100 18 298

(51) Int. Cl.
*G06F 15/00* (2006.01)
*G01D 5/34* (2006.01)

(52) U.S. Cl. .................. 702/151; 702/150; 250/231.13
(58) Field of Classification Search ................ 702/150, 702/151, 127; 250/231.13
See application file for complete search history.

(56) References Cited

U.S. PATENT DOCUMENTS

| | | | |
|---|---|---|---|
| 3,453,441 A * | 7/1969 | Buchla et al. ......... | 250/231.14 |
| 4,225,931 A | 9/1980 | Schwefel | |
| 4,229,646 A | 10/1980 | Burkhardt et al. | |
| 4,229,647 A | 10/1980 | Burkhardt | |
| 4,594,538 A | 6/1986 | Schmitt | |
| 4,594,579 A | 6/1986 | Schmitt et al. | |
| 4,618,940 A | 10/1986 | Schmitt | |
| 4,628,201 A | 12/1986 | Schmitt | |
| 4,631,404 A * | 12/1986 | Burkhardt et al. ...... | 250/237 G |
| 4,739,197 A | 4/1988 | Schmitt | |
| 5,294,793 A * | 3/1994 | Schwaiger et al. .... | 250/231.16 |
| 6,043,482 A * | 3/2000 | Hagl et al. ............. | 250/231.13 |

FOREIGN PATENT DOCUMENTS

EP    0 555 507    8/1993

OTHER PUBLICATIONS

Pending Patent Application Assigned to Dr. Johannes Heidenhain GmbH: U.S. Appl. No. 09/506,752, filed Feb. 18, 2000, Inventor: Feichtinger.

* cited by examiner

*Primary Examiner*—John Barlow
*Assistant Examiner*—Douglas N Washburn
(74) *Attorney, Agent, or Firm*—Brinks Hofer Gilson & Lione

(57) ABSTRACT

A method for detecting the angular change of a scanning device with respect to at least one scale of a position measuring system by detecting several angular positions of the scanning device in relation to the at least one scale by detecting position measurements of the scanning device at several scanning points and determining a value for a chronological progression of a change in angular positions of the scanning device from said detected several angular positions of the scanning device.

55 Claims, 3 Drawing Sheets

METHOD AND DEVICE FOR DETECTION OF OSCILLATIONS BY A POSITION MEASURING SYSTEM

Applicant claims, under 35 U.S.C. § 119, the benefit of priority of the filing date of Apr. 13, 2000 of a German patent application, copy attached, Serial Number 100 18 298.4, filed on the aforementioned date, the entire contents of which is incorporated herein by reference.

BACKGROUND OF THE INVENTION

1. Field of the Invention

The present invention relates to a method and a position measuring system for detecting the angular change of a component with respect to at least one scale of a position measuring system.

2. Discussion of Related Art

A position measuring system includes a scale and a scanning device, which is displaceable in the measuring direction with respect to the scale. Position-dependent measuring signals are formed in the course of this displacement by scanning the scale. The scale includes an incremental or an absolute multi-track coded graduation. In the course of scanning an absolute, multi-track coded graduation, several graduated tracks, which are arranged next to each other transversely with respect to the measuring direction, are scanned by several scanning points, which are also arranged next to each other. The instantaneous scanning values from all scanning points are linked with each other for forming the instantaneous absolute position measurement value. Such a position measuring system is known from EP 0 555 507 B1, for example.

For position measuring free of errors, the scanning device should not change its relative alignment (angular position) with respect to the scale. However, it has been shown that the alignment of the scanning device changes during operations. It has now been attempted to detect this change by measuring the instantaneous angular position of the scanning device and to correct the position measurement value as a function of the measured angle. This method, described in EP 0 555 507 B1, is only successful in case of relatively small angular changes. Moreover, corrective steps are only successful if the angular change remains within a defined range.

OBJECTS AND SUMMARY OF THE INVENTION

The present invention is therefore based in part on the object of disclosing a method for monitoring the progression of an angular change of a component in relation to a scale of a position measuring system, in order to detect a malfunction of the position measuring system, or an erroneous measurement, in good time.

This object is attained by a method for detecting the angular change of a scanning device with respect to at least one scale of a position measuring system by detecting several angular positions of the scanning device in relation to the at least one scale by detecting position measurements of the scanning device at several scanning points and determining a value for a chronological progression of a change in angular positions of the scanning device from the detected several angular positions of the scanning device.

The advantages of the method according to the present invention lie in particular in that not only the instantaneous angular position of the scanning device in relation to a desired position is determined, but also that a measurement of the chronological progression of the angular change can be detected. It is possible to decide on the basis of this measurement of the chronological progression, whether the position measurement is defined as being correct, or whether, in spite of known correcting steps, the position measurement is defined as being erroneous. It is possible by the method to detect the maximum size of the angular change, i.e. the oscillation amplitude, and therefore also the oscillation frequency, of the scanning device. From this value it is possible to draw conclusions regarding the source of the oscillation (vibration).

Another object of the present invention is moreover based on disclosing a position measuring system for detecting the progression of the angular change of a component in relation to a measurement representation.

This object is attained by a position measuring system that includes at least one scale, a scanning device that moves relative to the at least one scale along a measuring direction and an evaluation module. The evaluation module includes a first module for determining angular positions of the scanning device from several measured position values and a second module for determining a value for a chronological progression of several angular positions.

Further advantages and objects as well as details of the present invention will become apparent from the ensuing description of an exemplary embodiment in conjunction with the accompanying drawings.

DETAILED DESCRIPTION OF THE PREFERRED EMBODIMENTS

Figure 1:
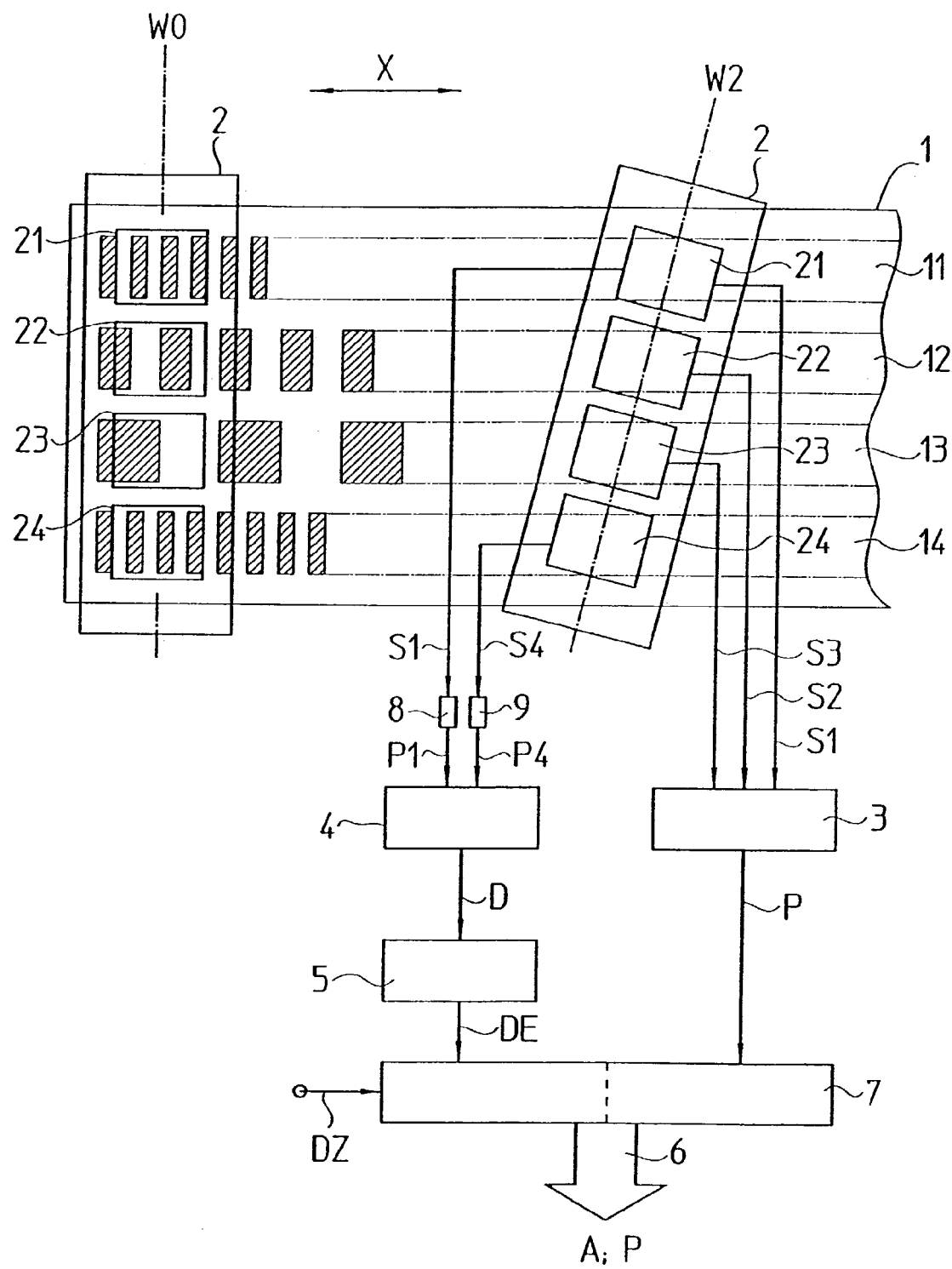
FIG. 1 schematically shows an embodiment of a linear position measuring arrangement according to the present invention.

A linear position measuring arrangement with a scale 1 and a scanning device 2 is represented in FIG. 1. The scale 1 has several graduated tracks 11, 12, 13, 14, whose grating lines extend in a known manner transversely with respect to the measuring direction X. In a known manner, the graduated tracks 11, 12 and 13 form an absolute code for absolute position measuring. Each one of the graduated tracks 11 to 14 is scanned by corresponding scanning points 21 to 24 for generating respective scanning signals S1 to S4. Optical, magnetic, inductive or capacitive scanning principles can be used for scanning.

The scanning signals S1 to S3 are linked in a known manner to form a resultant absolute measured position value P. The scanning signals S1 to S3 are conducted to a combinatorial circuit 3 for this purpose.

The alignment of the scanning device 2 with respect to the scale 1 continuously changes during the measuring operation because of guidance errors, but in particular because of vibrations.

The axis of rotation around which the scanning device 2 is tuned, or around which it is tilted, is a normal line with respect to the surface of the scale 1 on which the graduated tracks 11, 12, 13, 14 are installed.

It is known from EP 0 555 507 B1 to determine the angle W as a deviation from the desired position WO. This determination is also used in connection with the present invention. The two most finely graduated tracks 11 and 14, which are also at the greatest distance from each other in a direction perpendicular to the measuring direction X, are employed for this purpose in that the measured position value P1 provided by the scanning signal S1 is compared with the measured position value P4 provided by the scanning signal S4 in a module such as differential circuit 4. The difference between P1 and P4 is a measure of the instantaneous angle W.

Not only is the deviation of the alignment from a desired position, i.e. the angle W, measured in accordance with the present invention, but a value for the chronological change of the angle W is now determined. This step is advantageous, since a constant, or only slowly changing, wrong alignment does not lead to any, or only to a relatively easily correctable resultant measured position value P. But a rapid, or also large change of the alignment because of vibrations during the measuring operation can lead to an erroneous measured position value P. It is therefore necessary to detect this state.

To this end, a pair of scanning signals S1 and S4 from each of the scanning points 21 and 24 is simultaneously detected in sequential intervals of fractions of a second, for example 1 msec, the measured position values P1 and P4 are formed therefrom and the instantaneous difference D of the measured position values (P4-P1) is developed for each point in time in the differential circuit 4. The minimum and maximum values of the difference D are determined from a predetermined number, for example ten, of successive differences D, and thus within a predetermined length of time (10 msec in the example), and is stored in a second module such as memory device 5. The difference DE between the two extreme values of minimum difference value and maximum difference value is a measurement for the oscillation range of the angular change, and therefore a measurement of the vibration, or oscillation, of the scanning device 2 with respect to the scale 1.

The stored extreme values of the angular positions W are available to a user as the measurement of the chronological progression of the angular positions W. These values can be issued as numerical values, or they are graphically represented as the threshold values of a bar on a bar graph.

It is possible to additionally or alternatively calculate the oscillation range or amplitude DE of the scanning device 2 from the extreme values stored in the memory device 5 as a measurement of the chronological progression of the angular positions W, and to make this value DE available to the user as a numerical value, or also graphically, for example as a bar. It is also possible to display several values of the oscillation range DE for sequential periods of time simultaneously on a monitor. It is possible to observe the chronological progression of the oscillation range DE from this.

It is particularly advantageous if a permissible value DZ for the oscillation width is predetermined and a warning signal A is created and issued when the detected value of the oscillation width DE exceeds the predetermined value DZ.

The absolute measured position value P determined from the scanning signals S1 to S3 is conducted to an interface 7 in a bit-serial manner to an electronic follow-up device, for example a numerical control, on a data line 6. With such an interface 7, which transmits bit-serially, there is now a possibility to transmit the warning signal A, or the extreme values of the angular positions W, or the oscillation range DE, also serially on this data line 6 to the electronic follow-up device. In this case it is advantageous if all components 3, 4, 5, 7, 8 and 9 are integrated in the scanning device 2. Note that modules 4 and 5 may be formed in a common component.

Figure 2:
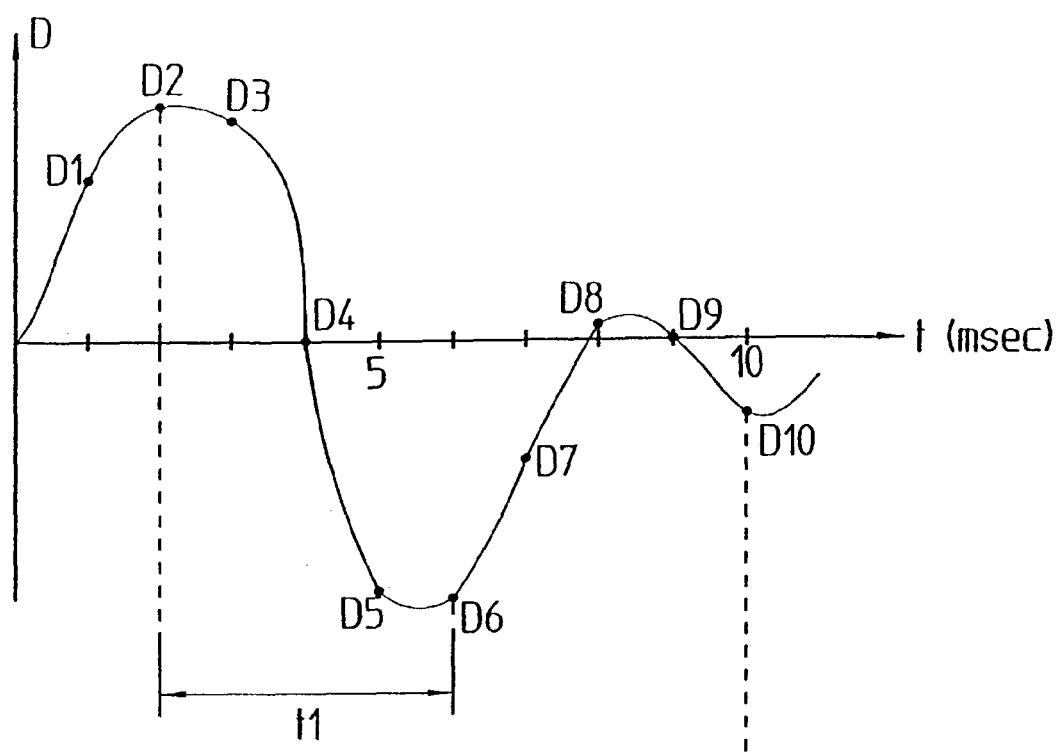
FIG. 2 shows the chronological progression of the angular position of the scanning device of the linear position measuring arrangement in accordance with FIG. 1.

The measured differential values D, which are proportional to the angular values W, have been entered in FIG. 2 as a function of the time t. In the example shown, the detected maximum differential value within ten successive position measurements, i.e. within a measurement time t of 10 msec, is identified by D2, and the detected minimum differential value by D6. The oscillation range DE, i.e. the maximum angular change within the measurement time t=10 msec, is therefore calculated as DE=(D2-D6).

Figure 3:
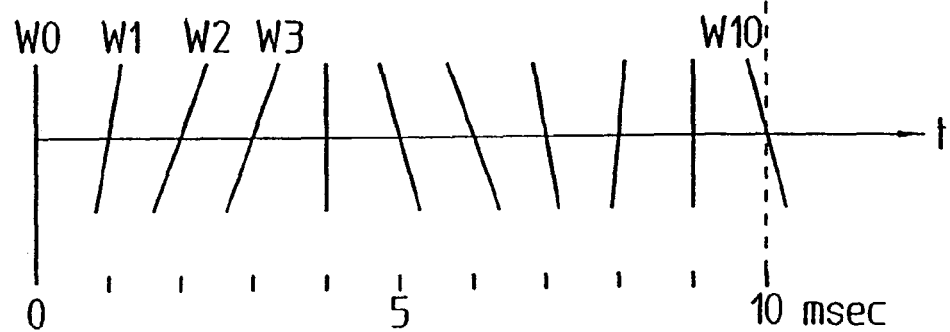
FIG. 3 schematically shows the angular positions of the scanning device, of the linear position measuring arrangement of FIG. 1.

The measured alignment, i.e. the angular position W of the scanning device 2 in the ten measured periods of time of 0 to 10 msec, is schematically represented in FIG. 3.

The measured position values P1 and P4 can be directly determined from the scanning signals S1 and S4 by a comparison of the analogous instantaneous values or, as customary in connection with incremental position measuring devices, digitally by counters 8 and 9. In that case, P1 and P4 are the counter settings of the counter 8 and 9. To simplify the representation, each scanning point 21 and 24 is shown only schematically in FIG. 1. As a rule, such scanning points 21, 24 each include several partial fields, which are phase-shifted with respect to each other, for a count, independent of the direction, of the detected increments, or interpolation values of the scanning signals S1 and S2.

In the described example, two evenly divided incremental tracks 11 and 14 are provided for determining the differential angular value D, or angular W. However, the angular values can also be determined from a common incremental track in accordance with FIG. 1 of EP 0 555 507 B1, or from differently graduated incremental tracks in accordance with FIG. 2 of EP 0 555 507 B1. With differently graduated tracks it is advantageous if both tracks are interpolated in such a way that the scanning signals have the same resolution, because then a simple comparison of counter settings is possible. One of the tracks can also have a serial coding in the form of a pseudo-random code, also called a chain code.

The value DE, D2, D6, W2, W6 of the chronological progression of the angular positions W1 to W10 can also be a clue for the accuracy of processing, because it is a parameter of the machine vibration.

To determine the cause of the vibration of the scanning device 2 with respect to the scale 1 it is advantageous to detect the frequency of the vibration, or oscillation. For this purpose successive extreme values of the angular positions W, i.e. the differential values D, are detected and the time t1 between these extreme values is determined. In the example in accordance with FIG. 2, the time t1 between the maximum D2 and the maximum D6 following it is determined. The frequency f then results from f=1/(2*t1). It is also possible to determine the time between two maximum values or two minimum values. The frequency f of the vibration of the scanning device 2 then results from f=1/(t2). The calculated frequency f can then be compared with the natural or resonating frequencies of the various components of the machine tool whose position is being measured. Such a comparison may provide evidence of the cause of the frequency f.

It is now also possible by the present invention to determine the time of maximum vibration. In the course of processing a workpiece in a numerically-controlled machine tool it is possible to detect which vibration occurs at which process step. From this knowledge it is possible to optimize the processing parameters or the structure of the machine tool, inclusive of the position measuring system, in particular the mechanical structure.

Figure 4:
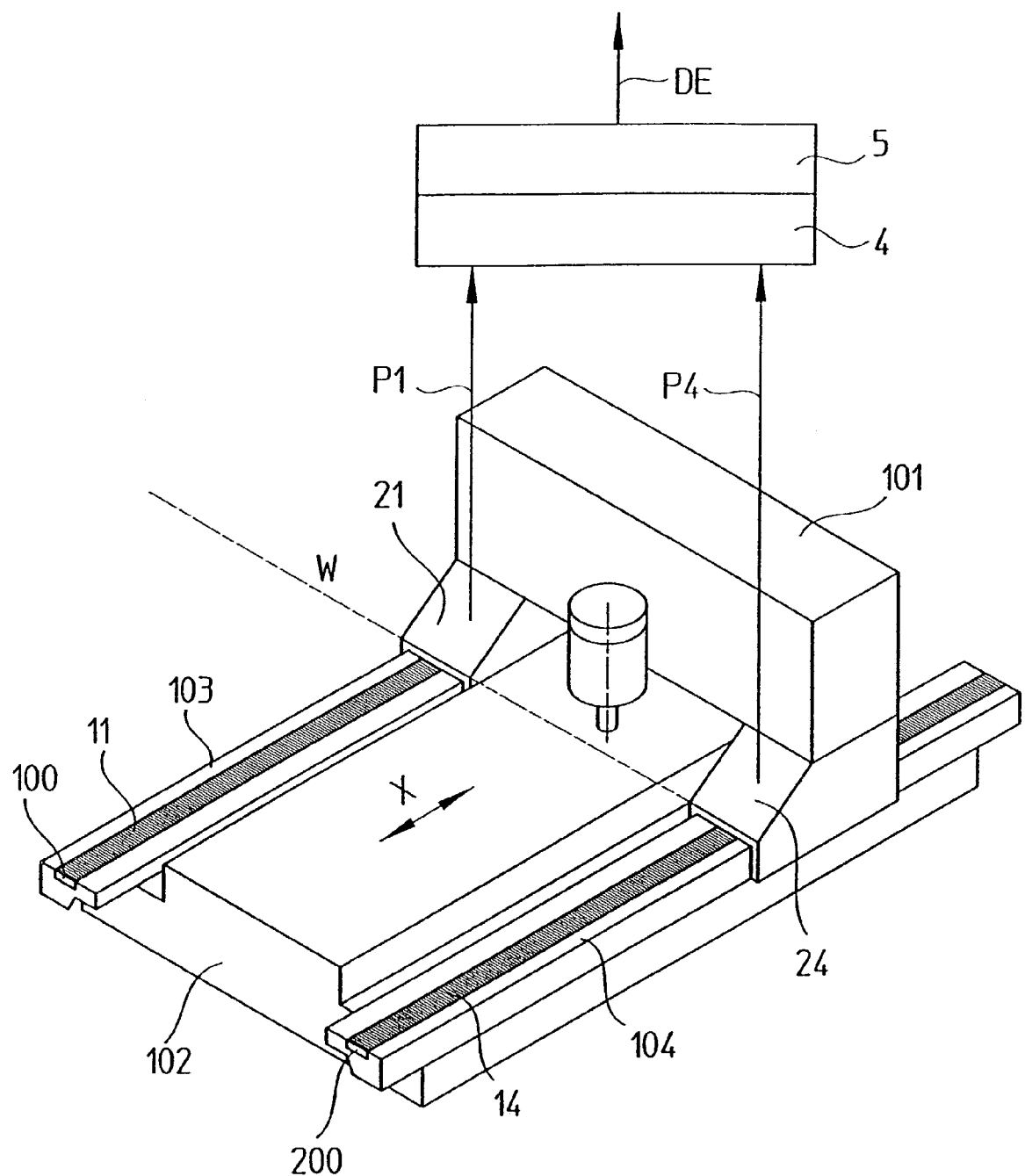
FIG. 4 shows an embodiment of a gantry structure to be used with the linear position measuring arrangement of FIG. 1.

In the exemplary embodiment in accordance with FIG. 1, the two graduated tracks 11, 14 are applied to a common scale 1 for generating a value DE for the chronological progression of the angular positions W1 to W10 of the scanning device 2. As schematically represented in FIG. 4, the graduated tracks 11, 14 can also be provided on separate scales 100, 200. For this, FIG. 4 shows a machine in the form of a gantry structure, wherein a bridge 101 can be displaced in the direction X with respect to a base 102 by two parallel guides 103, 104. The position in the direction X is determined by the scales 100, 200. Here, the scale 100 supports the graduated track 11, and the scale 200 supports the graduated track 14. The scanning points 21 and 24 are arranged on the bridge 101.

By this arrangement it is now possible to detect the chronological progression of the angular position W of the entire bridge 101 with respect to the base 102. The value DE of the chronological progression of the angular progression W of the bridge 101 here is a criteria of the quality of the ganging as well as the control performance of the drive mechanisms for displacing the bridge 101 along the guides 103, 104.

The foregoing description is provided to illustrate the invention, and is not to be construed as a limitation. Numerous additions, substitutions and other changes can be made to the invention without departing from its scope as set forth in the appended claims.

I claim:

1. A method for detecting the change of an angular inclination of a scanning device with respect to a linear measuring direction of at least one linear scale of a linear position measuring system, the method comprises:
   detecting several angular inclinations of said scanning device in relation to said linear measuring direction of said at least one linear scale by detecting position measurements of said scanning device at several scanning points;
   determining a value for a chronological progression of a change in angular inclinations of said scanning device from said detected several angular inclinations of said scanning device; and
   generating an output signal representative of said determined value for said chronological progression of said change in angular inclinations of said scanning device.

2. The method in accordance with claim 1, wherein said value of said chronological progression is determined as extreme values of said detected angular inclinations within a period of time.

3. The method in accordance with claim 1, wherein said value of said chronological progression is an oscillation range of said angular inclinations-formed from extreme values of said detected angular inclinations.

4. The method in accordance with claim 1, further comprising:
   a) simultaneously detecting a first measured position value of said scanning device at a first scanning point and detecting a second measured position value of said scanning device at a second scanning point;
   b) forming differential values between the simultaneously detected first and second measured position values at both said first scanning point and said second scanning point;
   c) performing several repetitions of steps a) and b) to form several differential values; and
   d) forming an oscillation range as a value of said chronological progression of change in said angular inclinations of said scanning device from several successive differential values formed in step c).

5. The method in accordance with claim 2, further comprising:
   a) simultaneously detecting a first measured position value of said scanning device at a first scanning point and detecting a second measured position value of said scanning device at a second scanning point;
   b) forming differential values between the simultaneously detected first and second measured position values at both said first scanning point and said second scanning point;
   c) performing several repetitions of steps a) and b) to form several differential values; and
   d) forming an oscillation range as a value of said chronological progression of change in said angular inclinations of said scanning device from several successive differential values formed in step c).

6. The method in accordance with claim 3, further comprising:
   a) simultaneously detecting a first measured position value of said scanning device at a first scanning point and detecting a second measured position value of said scanning device at a second scanning point;
   b) forming differential values between the simultaneously detected first and second measured position values at both said first scanning point and said second scanning point;
   c) performing several repetitions of steps a) and b) to form several differential values; and
   d) forming an oscillation range as a value of said chronological progression of change in said angular inclinations of said scanning device from several successive differential values formed in step c).

7. The method in accordance with claim 4, further comprising determining a minimum differential value and a maximum differential value from several successive differential values; and
   forming a difference between said minimum and maximum differential values that corresponds to said oscillation range.

8. The method in accordance with claim 7, further comprising storing said minimum differential value and said maximum differential value from several successive differential values.

9. The method in accordance with claim 2, further comprising creating a warning signal as said output signal when said determined value for said chronological progression of said change in angular inclinations of said scanning device exceeds a predetermined value.

10. The method in accordance with claim 3, further comprising creating a warning signal when said oscillation range exceeds a predetermined value.

11. The method in accordance with claim 4, further comprising finding successive extreme values in said differential values and determining a time between the detection of said successive extreme values.

12. The method in accordance with claim 11, wherein an oscillation frequency of said scanning device in relation to said scale is determined from said determined time between the detection of said successive extreme values.

13. The method in accordance with claim 12, wherein said successive extreme values are each maximum values.

14. The method in accordance with claim 12, wherein said successive extreme values are each minimum values.

15. The method in accordance with claim 12, wherein said successive extreme values are a maximum value and a minimum value.

16. The method in accordance with claim 1, wherein said scanning device can scan based on the principle selected from the group consisting of: diffractive scanning, magnetic scanning and capacitive scanning.

17. A linear position measuring system comprising:
   at least one linear scale;
   a scanning device that moves relative to said at least one linear scale along a linear measuring direction; and
   an evaluation module comprising:
      a first module for determining several angular inclinations of said scanning device with respect to said linear measuring direction, wherein each of said several angular inclinations is determined from several measured position values; and
      a second module for determining a value for a chronological progression of said several angular inclinations.

18. The position measuring system in accordance with claim 17, wherein said second module comprises a memory device, in which extreme values from several successive angular inclinations are stored.

19. The position measuring system in accordance with claim 17, wherein said scanning device comprises at least two scanning points for scanning said at least one linear scale simultaneously with said at least two scanning points and for forming said measured position values, and wherein said measured position values are provided to said evaluation unit, which processes said measured position values in such a way that a value for said chronological progression of said angular inclinations is present at an output of said evaluation unit.

20. The position measuring system in accordance with claim 18, wherein said scanning device comprises at least two scanning points for scanning said at least one linear scale and for forming measured position values, and wherein said measured position values are provided to said evaluation unit, which processes said measured position values in such a way that a value for said chronological progression of said angular positions is present at an output of said evaluation unit.

21. The position measuring system in accordance with claim 19, wherein said evaluation unit is integrated into said scanning device.

22. The position measuring system in accordance with claim 19, wherein said at least one linear scale comprises two graduated tracks, which are spaced apart from each other transversely to said measuring direction, and respectively one of said scanning points is assigned to one of said two graduated tracks.

23. The position measuring system in accordance with claim 19, wherein said at least one linear scale comprises a first linear scale that is arranged parallel with a second linear scale on a first machine element, and said at least two scanning points are arranged on a second machine element, wherein said first and second machine elements form a gantry structure.

24. The position measuring system in accordance with claim 17, wherein said first module and said second module are formed in a common component.

25. The position measuring system in accordance with claim 17, wherein said scanning device can scan based on the principle selected from the group consisting of: diffractive scanning, magnetic scanning and capacitive scanning.

26. A method for detecting the change of an angular inclination of a scanning device with respect to a linear measuring direction of at least one linear scale of a linear position measuring system, the method comprises:
   detecting several angular inclinations of said scanning device in relation to said linear measuring direction of said at least one linear scale by detecting position measurements of said scanning device at several scanning points;
   determining a value for a chronological progression of a change in angular inclinations of said scanning device from said detected several angular inclinations of said scanning device; and
   issuing to a user a numerical value representative of said determined value for said chronological progression of said change in angular inclinations of said scanning device.

27. The method in accordance with claim 26, wherein said value of said chronological progression is determined as extreme values of said detected angular inclinations within a period of time.

28. The method in accordance with claim 26, wherein said value of said chronological progression is an oscillation range of said angular inclinations-formed from extreme values of said detected angular inclinations.

29. The method in accordance with claim 26, further comprising:
   a) simultaneously detecting a first measured position value of said scanning device at a first scanning point and detecting a second measured position value of said scanning device at a second scanning point;
   b) forming differential values between the simultaneously detected first and second measured position values at both said first scanning point and said second scanning point;
   c) performing several repetitions of steps a) and b) to form several differential values; and
   d) forming an oscillation range as a value of said chronological progression of change in said angular inclinations of said scanning device from several successive differential values formed in step c).

30. The method in accordance with claim 27, further comprising:
   a) simultaneously detecting a first measured position value of said scanning device at a first scanning point and detecting a second measured position value of said scanning device at a second scanning point;
   b) forming differential values between the simultaneously detected first and second measured position values at both said first scanning point and said second scanning point;
   c) performing several repetitions of steps a) and b) to form several differential values; and
   d) forming an oscillation range as a value of said chronological progression of change in said angular inclinations of said scanning device from several successive differential values formed in step c).

31. The method in accordance with claim 28, further comprising:

a) simultaneously detecting a first measured position value of said scanning device at a first scanning point and detecting a second measured position value of said scanning device at a second scanning point;

b) forming differential values between the simultaneously detected first and second measured position values at both said first scanning point and said second scanning point;

c) performing several repetitions of steps a) and b) to form several differential values; and d) forming an oscillation range as a value of said chronological progression of change in said angular inclinations of said scanning device from several successive differential values formed in step c).

32. The method in accordance with claim 29, further comprising determining a minimum differential value and a maximum differential value from several successive differential values; and forming a difference between said minimum and maximum differential values that corresponds to said oscillation range.

33. The method in accordance with claim 32, further comprising storing said minimum differential value and said maximum differential value from several successive differential values.

34. The method in accordance with claim 28, further comprising creating a warning signal when said oscillation range exceeds a predetermined value.

35. The method in accordance with claim 29, further comprising finding successive extreme values in said differential values and determining a time between the detection of said successive extreme values.

36. The method in accordance with claim 35, wherein an oscillation frequency of said scanning device in relation to said scale is determined from said determined time between the detection of said successive extreme values.

37. The method in accordance with claim 36, wherein said successive extreme values are each maximum values.

38. The method in accordance with claim 36, wherein said successive extreme values are each minimum values.

39. The method in accordance with claim 36, wherein said successive extreme values are a maximum value and a minimum value.

40. The method in accordance with claim 26, wherein said scanning device can scan based on the principle selected from the group consisting of: diffractive scanning, magnetic scanning and capacitive scanning.

41. A method for detecting the change of an angular inclination of a scanning device with respect to a linear measuring direction of at least one linear scale of a linear position measuring system, the method comprises:

detecting several angular inclinations of said scanning device in relation to said linear measuring direction of said at least one linear scale by detecting position measurements of said scanning device at several scanning points;

determining a value for a chronological progression of a change in angular inclinations of said scanning device from said detected several angular inclinations of said scanning device; and graphically representing said determined value for said chronological progression of said change in angular inclinations of said scanning device.

42. The method in accordance with claim 41, wherein said scanning device can scan based on the principle selected from the group consisting of: diffractive scanning, magnetic scanning and capacitive scanning.

43. The method in accordance with claim 41, wherein said value of said chronological progression is determined as extreme values of said detected angular inclinations within a period of time.

44. The method in accordance with claim 41, wherein said value of said chronological progression is an oscillation range of said angular inclinations-formed from extreme values of said detected angular inclinations.

45. The method in accordance with claim 41, further comprising:

a) simultaneously detecting a first measured position value of said scanning device at a first scanning point and detecting a second measured position value of said scanning device at a second scanning point;

b) forming differential values between the simultaneously detected first and second measured position values at both said first scanning point and said second scanning point;

c) performing several repetitions of steps a) and b) to form several differential values; and d) forming an oscillation range as a value of said chronological progression of change in said angular inclinations of said scanning device from several successive differential values formed in step c).

46. The method in accordance with claim 43, further comprising:

a) simultaneously detecting a first measured position value of said scanning device at a first scanning point and detecting a second measured position value of said scanning device at a second scanning point;

b) forming differential values between the simultaneously detected first and second measured position values at both said first scanning point and said second scanning point;

c) performing several repetitions of steps a) and b) to form several differential values; and d) forming an oscillation range as a value of said chronological progression of change in said angular inclinations of said scanning device from several successive differential values formed in step c).

47. The method in accordance with claim 44, further comprising:

a) simultaneously detecting a first measured position value of said scanning device at a first scanning point and detecting a second measured position value of said scanning device at a second scanning point;

b) forming differential values between the simultaneously detected first and second measured position values at both said first scanning point and said second scanning point;

c) performing several repetitions of steps a) and b) to form several differential values; and d) forming an oscillation range as a value of said chronological progression of change in said angular inclinations of said scanning device from several successive differential values formed in step c).

48. The method in accordance with claim 45, further comprising determining a minimum differential value and a maximum differential value from several successive differential values; and forming a difference between said minimum and maximum differential values that corresponds to said oscillation range.

49. The method in accordance with claim 48, further comprising storing said minimum differential value and said maximum differential value from several successive differential values.

50. The method in accordance with claim 44, further comprising creating a warning signal when said oscillation range exceeds a predetermined value.

51. The method in accordance with claim 45, further comprising finding successive extreme values in said differential values and determining a time between the detection of said successive extreme values.

52. The method in accordance with claim 51, wherein an oscillation frequency of said scanning device in relation to said scale is determined from said determined time between the detection of said successive extreme values.

53. The method in accordance with claim 52, wherein said successive extreme values are each maximum values.

54. The method in accordance with claim 52, wherein said successive extreme values are each minimum values.

55. The method in accordance with claim 52, wherein said successive extreme values are a maximum value and a minimum value.

* * * * *